United States Patent
Lim et al.

(10) Patent No.: US 9,753,343 B2
(45) Date of Patent: Sep. 5, 2017

(54) LIQUID CRYSTAL DISPLAY DEVICE HAVING WHITE PIXEL

(71) Applicant: Samsung Display Co., Ltd., Yongin, Gyeonggi-Do (KR)

(72) Inventors: Sang Uk Lim, Yongin-si (KR); Wan-Soon Im, Cheonan-si (KR); Sun Hwa Lee, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/792,207

(22) Filed: Jul. 6, 2015

(65) Prior Publication Data

US 2016/0178954 A1    Jun. 23, 2016

(30) Foreign Application Priority Data

Dec. 18, 2014  (KR) .................. 10-2014-0183202

(51) Int. Cl.
*G02F 1/1335* (2006.01)
*G09G 3/20* (2006.01)
*G02F 1/1362* (2006.01)
*G02F 1/1343* (2006.01)

(52) U.S. Cl.
CPC .... *G02F 1/13624* (2013.01); *G02F 1/134309* (2013.01); *G02F 1/136213* (2013.01); *G02F 1/136286* (2013.01); *G02F 2001/134345* (2013.01)

(58) Field of Classification Search
CPC ....... G02F 1/1323; G02F 2001/134345; G02F 1/136213; G02F 1/133555; G09G 3/3607
See application file for complete search history.

(56) References Cited

U.S. PATENT DOCUMENTS

| | | | | |
|---|---|---|---|---|
| 2004/0135937 | A1* | 7/2004 | Lee | G02F 1/133514 349/106 |
| 2010/0045915 | A1* | 2/2010 | No | G02F 1/133514 349/138 |
| 2010/0265272 | A1* | 10/2010 | Bae | G09G 3/2003 345/690 |
| 2012/0249940 | A1* | 10/2012 | Choi | G02F 1/133753 349/123 |
| 2012/0327135 | A1* | 12/2012 | Kitayama | G09G 3/3607 345/690 |
| 2013/0119857 | A1* | 5/2013 | Su | H05B 33/10 313/504 |
| 2013/0208206 | A1* | 8/2013 | Park | H01L 29/41733 349/46 |

FOREIGN PATENT DOCUMENTS

| | | |
|---|---|---|
| JP | 2004-280111 | 10/2004 |
| JP | 2006-308768 | 11/2006 |
| KR | 10-2005-0005670 | 1/2005 |
| KR | 10-2008-0112855 | 12/2008 |

* cited by examiner

*Primary Examiner* — Jonathan Y Jung
(74) *Attorney, Agent, or Firm* — Innovation Counsel LLP (57) ABSTRACT

A display device includes a red pixel, a blue pixel, a green pixel, and a white pixel; a plurality of gate lines and data lines; and a plurality of storage electrode lines. Each of the red pixel, the blue pixel, and the green pixel includes two subpixel electrodes connected to a same gate line and a same data line and charged with different voltages. Every subpixel electrode included in the white pixel and connected to a same gate line and a same data line have a same voltage.

7 Claims, 9 Drawing Sheets

LIQUID CRYSTAL DISPLAY DEVICE HAVING WHITE PIXEL

CROSS-REFERENCE TO RELATED APPLICATION

This application claims priority to and the benefit of Korean Patent Application No. 10-2014-0183202 filed in the Korean Intellectual Property Office on Dec. 18, 2014, the entire contents of which are incorporated herein by reference.

BACKGROUND (a) Technical Field

The present disclosure generally discloses a liquid crystal display including a white pixel.

(b) Description of the Related Art

A liquid crystal display (LCD) is one of the most widely used flat panel displays. A liquid crystal display includes a pair of panels provided with field-generating electrodes and a liquid crystal (LC) layer interposed between the two panels. Voltages are applied to the field-generating electrodes to generate an electric field in the liquid crystal layer. The electric field determines the orientation of liquid crystal molecules in the liquid crystal layer and adjusts polarization of incident light passing through the liquid crystal layer, thereby displaying images on the liquid crystal display.

As mentioned above, the liquid crystal display includes a pair of panels provided with field-generating electrodes. Specifically, the liquid crystal display includes a thin film transistor array panel and a common electrode panel facing each other. The thin film transistor array panel includes a gate line for transmitting a gate signal and a data line for transmitting a data signal, a thin film transistor connected to the gate line and the data line, and a pixel electrode connected to the thin film transistor. The gate line and the data line intersect each other. The common electrode panel includes a light blocking member, a color filter, and a common electrode.

However, in some cases, the liquid crystal display may have issues relating to poor visibility and viewing angle.

The above information disclosed in this Background section is to enhance understanding of the background of the inventive concept and may contain information that does not form prior art that is already known in this country to a person of ordinary skill in the art.

SUMMARY

The present disclosure addresses at least the above issues relating to poor visibility and viewing angle, by providing a liquid crystal display having improved luminance.

According to embodiments of the inventive concept, a display device is provided. The display device includes: a red pixel, a blue pixel, a green pixel, and a white pixel; a plurality of gate lines and data lines; and a plurality of storage electrode lines, wherein each of the red pixel, the blue pixel, and the green pixel comprises two subpixel electrodes connected to a same gate line and a same data line and charged with different voltages, and wherein every subpixel electrode included in the white pixel and connected to a same gate line and a same data line have a same voltage.

In some embodiments, each of the red pixel, the blue pixel, and the green pixel may include: a first thin film transistor and a second thin film transistor, wherein a control terminal and an input terminal of each of the first and second thin film transistors may be respectively connected to the same gate line and the same data line; a third thin film transistor, wherein a control terminal of the third thin film transistor may be connected to the same gate line, an input terminal of the third thin film transistor may be connected to an output terminal of the second thin film transistor, and an output terminal of the third thin film transistor may be connected to one of the storage electrode lines; a first subpixel electrode connected to an output terminal of the first thin film transistor; and a second subpixel electrode connected to the output terminal of the second thin film transistor.

In some embodiments, the white pixel may include: a fourth thin film transistor, wherein a control terminal of the fourth thin film transistor may be connected to the same gate line and an input terminal of the fourth thin film transistor may be connected to the same data line; and a third subpixel electrode and a fourth subpixel electrode connected to an output terminal of the fourth thin film transistor.

In some embodiments, the white pixel may include: only one thin film transistor and only one subpixel electrode, wherein the only one thin film transistor has a control terminal connected to the same gate line and an input terminal connected to the same data line, and wherein the only one subpixel electrode is connected to an output terminal of the only one thin film transistor.

In some embodiments, the red pixel, the blue pixel, and the green pixel may be disposed longitudinally in a vertical direction, and wherein the white pixel may be disposed longitudinally below or above the red pixel, the blue pixel, and the green pixel in a horizontal direction.

In some embodiments, the red pixel, the blue pixel, and the green pixel may be configured to receive gate control signals through a first gate line, and wherein the white pixel may be configured to receive a gate control signal through a second gate line.

In some embodiments, each of the red pixel, the blue pixel, and the green pixel may include: a first thin film transistor and a second thin film transistor, wherein control terminals of each of the first and second thin film transistors may be connected to the first gate line, and input terminals of each of the first and second thin film transistors may be connected to a first data line; a third thin film transistor, wherein a control terminal of the third thin film transistor may be connected to the first gate line, an input terminal of the third thin film transistor may be connected to an output terminal of the second thin film transistor, and an output terminal of the third thin film transistor may be connected to one of the storage electrode lines; a first subpixel electrode connected to an output terminal of the first thin film transistor; and a second subpixel electrode connected to the output terminal of the second thin film transistor.

In some embodiments, the white pixel may include: a fourth thin film transistor, wherein a control terminal of the fourth thin film transistor may be connected to the second gate line and an input terminal of the fourth thin film transistor may be connected to the first data line; and a third subpixel electrode and a fourth subpixel electrode connected to an output terminal of the fourth thin film transistor.

In some embodiments, each of the first subpixel electrode, the second subpixel electrode, the third subpixel electrode, and the fourth subpixel electrode may have a slit structure.

In some embodiments, the white pixel may include: a fourth thin film transistor, wherein a control terminal of the fourth thin film transistor may be connected to the second gate line and an input terminal of the fourth thin film transistor may be connected to the first data line; and a third subpixel electrode connected to an output terminal of the fourth thin film transistor, wherein the third subpixel electrode is the sole subpixel electrode comprised in the white pixel.

In some embodiments, each of the first subpixel electrode, the second subpixel electrode, and the third subpixel electrode may have a slit structure.

In some embodiments, the white pixel may include: a fourth thin film transistor which has a control terminal connected to the second gate line and an input terminal connected to the first data line connected to the first thin film transistor and the second thin film transistor of the red pixel; a fifth thin film transistor which has a control terminal connected to the second gate line and an input terminal connected to the first data line connected to the first thin film transistor and the second thin film transistor of the green pixel; a sixth thin film transistor which has a control terminal connected to the second gate line and an input terminal connected to the first data line connected to the first thin film transistor and the second thin film transistor of the blue pixel; a third subpixel electrode connected to an output terminal of the fourth thin film transistor; a fourth subpixel electrode connected to an output terminal of the fifth thin film transistor; and a fifth subpixel electrode connected to an output terminal of the sixth thin film transistor.

In some embodiments, each of the first subpixel electrode, the second subpixel electrode, the third subpixel electrode, the fourth subpixel electrode, and the fifth subpixel electrode may have a slit structure.

DETAILED DESCRIPTION

The inventive concept will be described more fully herein with reference to the accompanying drawings, in which exemplary embodiments are shown. As those skilled in the art would realize, the embodiments may be modified in various ways without departing from the spirit or scope of the inventive concept.

In the drawings, the thicknesses of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element, or with one or more intervening elements being present. In contrast, when an element is referred to as being "directly on" another element, there are no intervening elements present.

A liquid crystal display according to an exemplary embodiment will be described with the accompanying figures.

Figure 1:
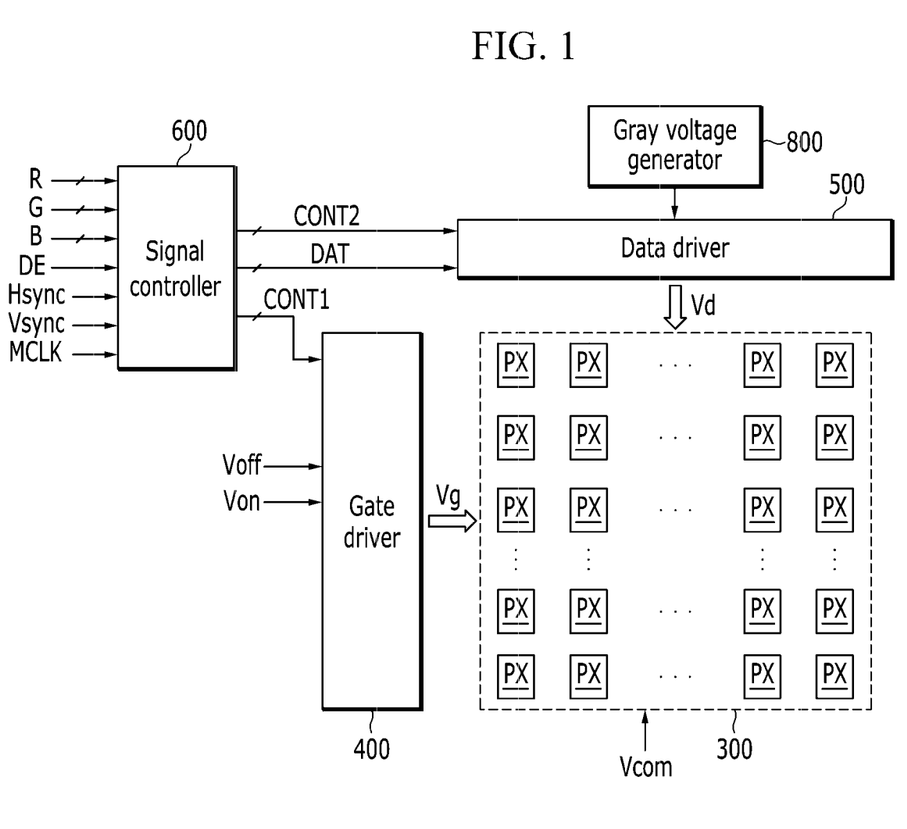
FIG. 1 is a block diagram illustrating a liquid crystal display according to an exemplary embodiment.
Figure 2:
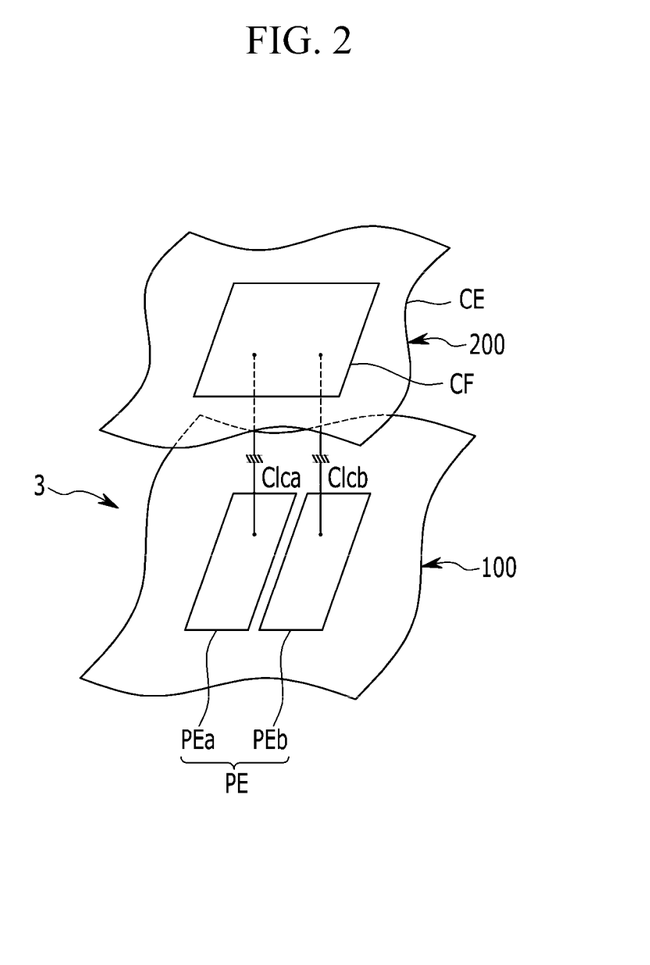
FIG. 2 is an equivalent circuit diagram illustrating a single pixel of a liquid crystal display according to an exemplary embodiment.

FIG. 1 is a block diagram illustrating a liquid crystal display according to an exemplary embodiment, and FIG. 2 is an equivalent circuit diagram illustrating a pixel of a liquid crystal display according to an exemplary embodiment.

As shown in FIG. 1, the liquid crystal display includes a liquid crystal panel assembly 300, a gate driver 400 and a data driver 500 connected to the liquid crystal panel assembly 300, a gray voltage generator 800 connected to the data driver 500, and a signal controller 600 for controlling the above components.

When depicted as an equivalent circuit, the liquid crystal panel assembly 300 includes a plurality of signal lines (not shown) and a plurality of pixels PX that are connected to the signal lines and substantially arranged in a matrix. As seen from the structure shown in FIG. 2, the liquid crystal panel assembly 300 includes a thin film transistor array panel 100 and an opposing display panel 200 facing each other with a liquid crystal layer 3 interposed therebetween.

The signal lines include a plurality of gate lines (not shown) for transmitting a gate signal (also referred to as a "scan signal") and a plurality of data lines (not shown) for transmitting a data signal. The gate lines extend substantially in a row direction and are substantially parallel to each other. Further, the data lines extend substantially in a column direction and are substantially parallel to each other.

Each of the pixels PX includes a pair of subpixels, and each of the subpixels includes liquid crystal capacitors Clca and Clcb. At least one of the two subpixels includes a switching element (not shown) connected to the gate line, the data line, and the liquid crystal capacitors Clca and Clcb.

The liquid crystal capacitors Clca and Clcb include a subpixel electrode PEa/PEb of the thin film transistor array panel 100 serving as a first terminal and a common electrode CE of the opposing display panel 200 serving as a second terminal, and the liquid crystal layer 3 between the subpixel electrodes PEa/PEb and the common electrode CE serves as a dielectric material. The pair of subpixel electrodes PEa/PEb are separated from each other and collectively constitute a single pixel electrode PE. The common electrode CE is formed on an entire surface of the opposing display panel 200, and a common voltage Vcom is applied to the common electrode CE. The liquid crystal layer 3 has negative dielectric anisotropy. Liquid crystal molecules of the liquid crystal layer 3 may be aligned perpendicularly to the thin film transistor array panel 100 in the absence of an electric field.

To realize color display, each pixel PX uniquely displays one of primary colors (spatial division) or each pixel PX temporally and alternately displays primary colors (temporal division). The primary colors may be spatially and/or temporally divided to obtain a desired color. Examples of the primary colors may include the three primary colors of red, green, and blue. FIG. 2 shows an example of spatial division. In FIG. 2, each pixel PX has a color filter CF in a region of the opposing display panel 200. The color filter CF represents one of the primary colors. However, the inventive concept need not be limited to the configuration illustrated in FIG. 2. In some other embodiments, the color filter CF may be formed above or below the first and second subpixel electrodes PEa and PEb of the thin film transistor array panel 100.

At least one polarizer (not shown) for polarizing light is attached on outer surfaces of the liquid crystal panel assembly 300.

Referring to FIG. 1, the gray voltage generator 800 is configured to generate all gray voltages. In some embodiments, the gray voltage generator 800 may be configured to generate a limited number of gray voltages (herein referred to as "reference gray voltages") related to transmittance of the pixels PX. The gray voltages or the reference gray voltages may be positive or negative with respect to the common voltage Vcom.

The gate driver 400 is connected to a gate line of the liquid crystal panel assembly 300. The gate driver 400 is configured to apply a gate signal Vg to the gate line. The gate signal Vg includes a combination of a gate-on voltage Von and a gate-off voltage Voff.

The data driver 500 is connected to the data line of the liquid crystal panel assembly 300. The data driver 500 is configured to select a gray voltage from the gray voltage generator 800 and apply the gray voltage as a data voltage Vd to the data line. However, when the gray voltage generator 800 does not provide the voltage for all gray levels but instead provides a predetermined number of reference gray voltages, the data driver 500 is then configured to divide the reference gray voltages so as to generate gray voltages for all gray levels, and to select a data signal from among the gray voltages.

The signal controller 600 includes an image signal converter (not shown) and is configured to receive control signals (DE, Hsync, Vsync, MCLK) and image signals (R, G, B) from an external device (not shown) and control the gate driver 400 and the data driver 500 by transmitting signals (CONT1, CONT2, DAT).

The drivers 400, 500, 600, and 800 may be directly integrated onto the liquid crystal panel assembly 300 in the form of at least one integrated circuit (IC) chip. In some embodiments, the drivers 400, 500, 600, and 800 may be assembled onto a flexible printed circuit film (not shown) that is subsequently attached on the liquid crystal panel assembly 300 in the form of a tape carrier package (TCP). In some other embodiments, the drivers 400, 500, 600, and 800 may be assembled onto a separate printed circuit board (PCB) (not shown) that is connected to the liquid crystal panel assembly 300. In some further embodiments, the drivers 400, 500, 600, and 800 may be integrated in the liquid crystal panel assembly 300 along with the signal line and the thin film transistor switching element.

Next, a liquid crystal display according to different exemplary embodiments will be described with reference to FIGS. 3, 4, 5, 6, 7, 8, and 9, as well as FIGS. 1 and 2.

Figure 3:
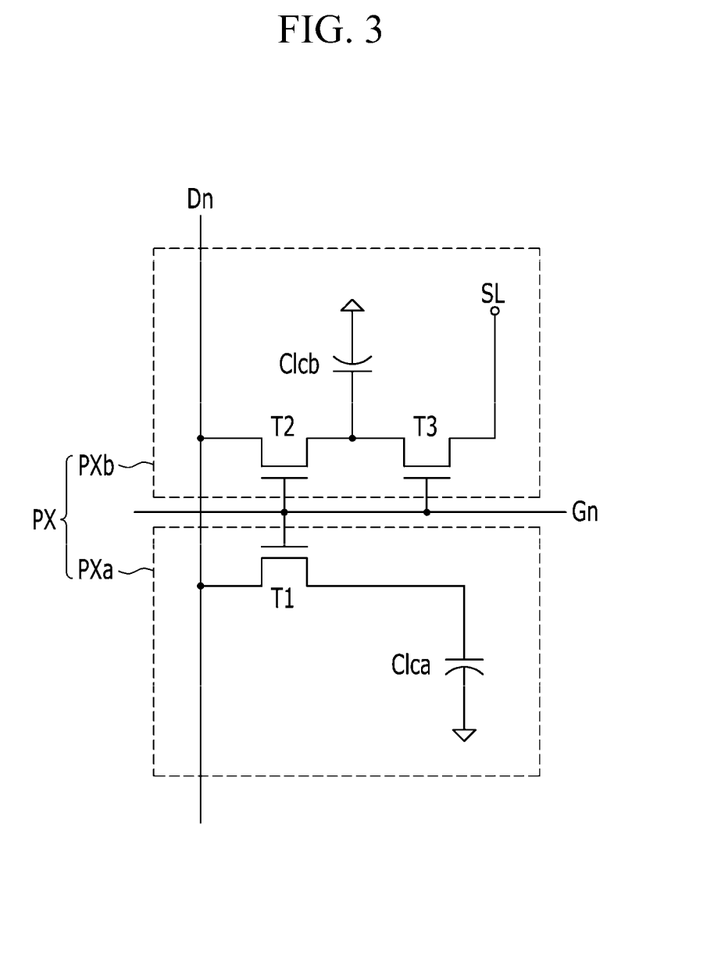
FIG. 3 is an equivalent circuit diagram illustrating a red pixel, a green pixel, and a blue pixel of a liquid crystal display according to an exemplary embodiment.
Figure 4:
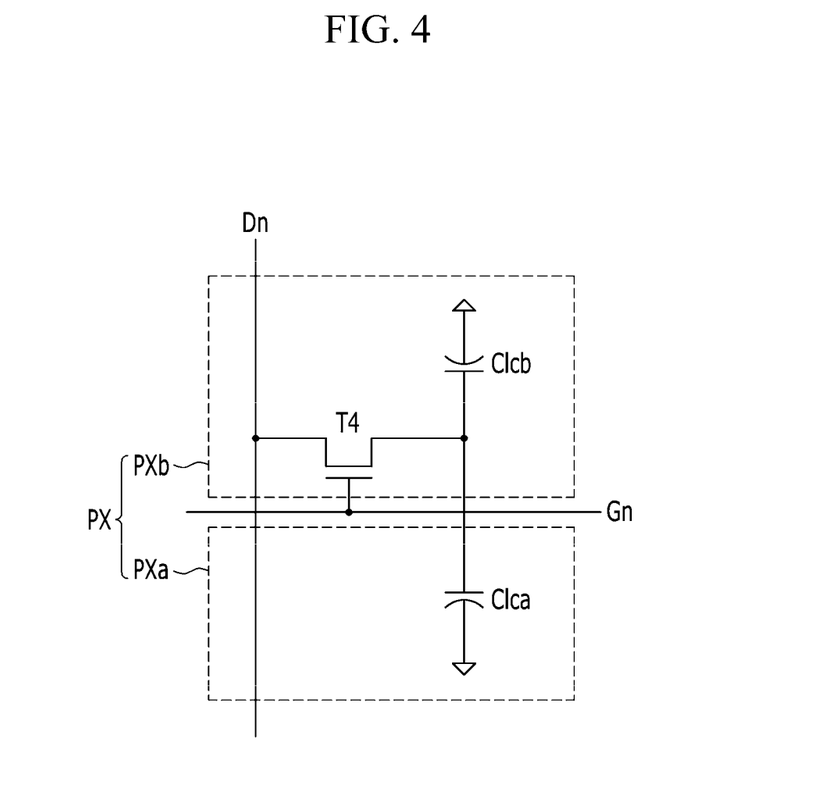
FIG. 4 is an equivalent circuit diagram illustrating a liquid crystal display according to an exemplary embodiment.
Figure 5:
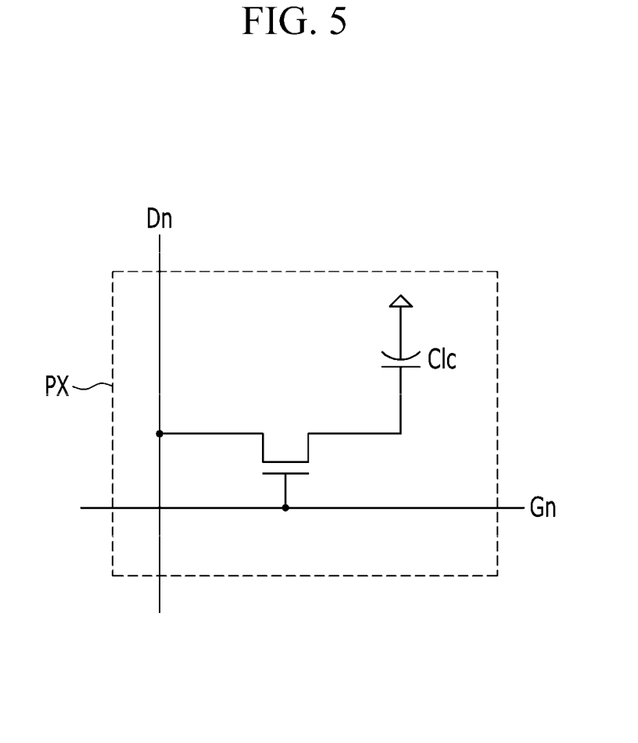
FIG. 5 is an equivalent circuit diagram illustrating a liquid crystal display according to another exemplary embodiment.

FIG. 3 is an equivalent circuit diagram illustrating a red pixel, a green pixel, and a blue pixel of a liquid crystal display according to an exemplary embodiment, and FIGS. 4 and 5 are equivalent circuit diagrams illustrating a liquid crystal display according to different exemplary embodiments.

The liquid crystal display according to the present exemplary embodiment includes a white pixel as well as a red pixel, a green pixel, and a blue pixel. The white pixel has a structure that is different from the structure of the red, green, and blue pixels, as described in more detail below.

First, a red pixel, a green pixel, and a blue pixel of a liquid crystal display according to various exemplary embodiments will be described.

Referring to FIGS. 1 and 3, each of the red pixel, the green pixel, and the blue pixel of the liquid crystal display according to the present exemplary embodiment includes a plurality of signal lines and a plurality of pixels PX connected thereto.

The signal lines include a gate line Gn for transmitting a gate signal (also referred to as a "scan signal"), a data line Dn for transmitting a data voltage, and a storage electrode line SL to which a constant voltage is applied.

A first thin film transistor T1 and a second thin film transistor T2 are formed. The first and second thin film transistors T1 and T2 are connected to the same gate line Gn and the same data line Dn. Further, a third thin film transistor T3 is formed such that the third thin film transistor T3 is connected to the same gate line Gn as the first and second transistors T1 and T2, and also connected to the second thin film transistor T2 and the storage electrode line SL.

Each pixel PX includes two subpixels PXa and PXb. A first liquid crystal capacitor Clca is formed in the first subpixel PXa and connected to the first thin film transistor T1. A second liquid crystal capacitor Clcb is formed in the second subpixel PXb and connected to the second thin film transistor T2.

A first terminal of the first thin film transistor T1 is connected to the gate line Gn, a second terminal of the first thin film transistor T1 is connected to the data line Dn, and a third terminal of the first thin film transistor T1 is connected to the first liquid crystal capacitor Clca. A first terminal of the second thin film transistor T2 is connected to the gate line Gn, a second terminal of the second thin film transistor T2 is connected to the data line Dn, and a third terminal of the second thin film transistor T2 is connected to the second liquid crystal capacitor Clcb. A first terminal of the first thin film transistor T3 is connected to the gate line Gn, a second terminal of the first thin film transistor T3 is connected to the third terminal of the second thin film transistor T2, and a third terminal of the first thin film transistor T3 is connected to the storage electrode line SL.

During operation of the red, green, and blue pixels of the liquid crystal display, when the gate-on voltage is applied to the gate line Gn, the first, second, and third thin film transistors T1, T2, and T3 connected thereto are turned on, and the first liquid crystal capacitor Clca and the second liquid crystal capacitor Clcb are charged by the data voltage transmitted through the data line Dn.

In the above embodiment, since the third thin film transistor T3 is turned on, some of the voltages charged in the second liquid crystal capacitor Clcb are leaked through the storage electrode line SL. Accordingly, even though the data voltages that are transmitted to the first subpixel PXa and the second subpixel PXb through the data line Dn are equal to each other (i.e., the same), the voltages that are charged in the first liquid crystal capacitor Clca and the second liquid crystal capacitor Clcb are different from each other. For example, the voltage that is charged in the second liquid crystal capacitor Clcb is lower than the voltage that is charged in the first liquid crystal capacitor Clca. Accordingly, side visibility can be improved by charging different subpixels PXa and PXb in the same pixel PX with different voltages.

Next, a white pixel of a liquid crystal display according to an exemplary embodiment will be described.

Referring to FIG. 4, a transistor T4 is disposed in the white pixel, and a control terminal and an input terminal of the transistor T4 are respectively connected to a gate line Gn and a data line Dn.

Each pixel PX includes two subpixels PXa and PXb, and a first liquid crystal capacitor Clca and a second liquid crystal capacitor Clcb are respectively formed in the two subpixels PXa and PXb. Each of the first liquid crystal capacitor Clca and the second liquid crystal capacitor Clcb are connected to an output terminal of the thin film transistor T4. Accordingly, the first liquid crystal capacitor Clca and the second liquid crystal capacitor Clcb are charged with the same voltage.

In some alternative embodiments, a thin film transistor and a liquid crystal capacitor Clc may be disposed in a white pixel in a liquid crystal display, for example, as shown in FIG. 5.

Accordingly, each of the red, green, and blue pixels of the liquid crystal display according to the present exemplary embodiment has a structure in which the two subpixels PXa and PXb are charged with different voltages, thereby improving side visibility. The white pixel of the liquid crystal display according to the present exemplary embodiment has another structure in which the two subpixels PXa and PXb are charged with the same voltage. In some alternative embodiments, the white pixel may have a structure in which only one pixel (an undivided pixel) is charged with a voltage. The above configurations increase an aperture ratio of the white pixel, thereby improving the luminance of the liquid crystal display.

Next, the layout of the red, green, and blue pixels, and a shape of a pixel electrode in a liquid crystal display according to an exemplary embodiment will be described in more detail with reference to FIGS. 6, 7, 8, and 9.

Figure 6:
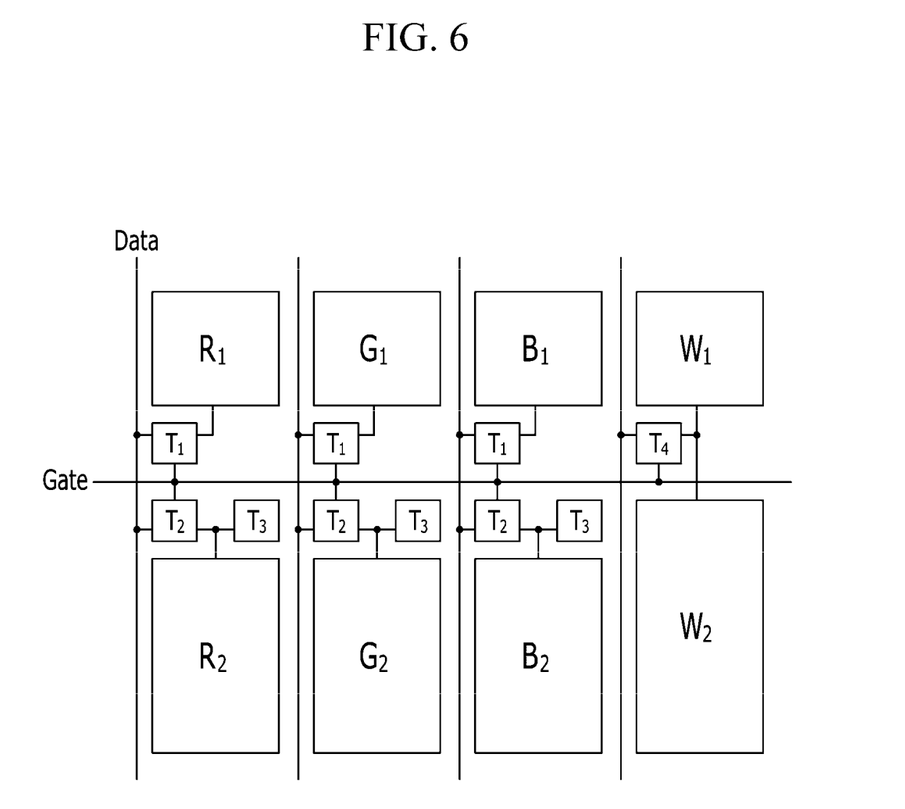
FIG. 6 is a layout view of a pixel of a liquid crystal display according to an exemplary embodiment.
Figure 7:
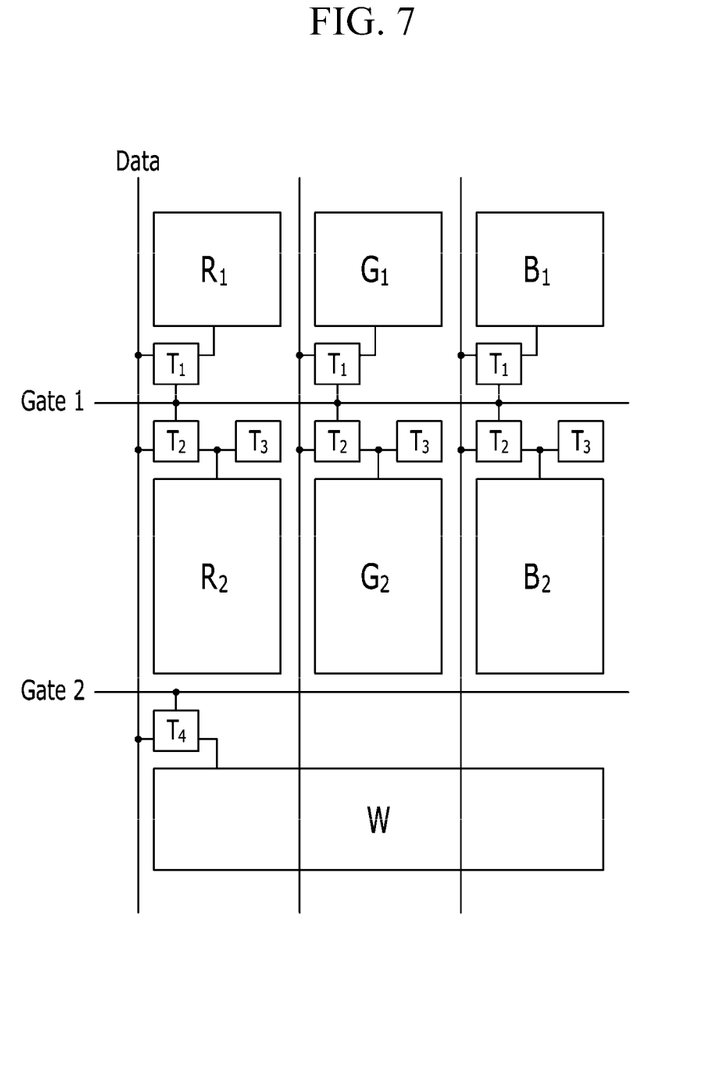
FIG. 7 is a layout view of a pixel of a liquid crystal display according to another exemplary embodiment.
Figure 8:
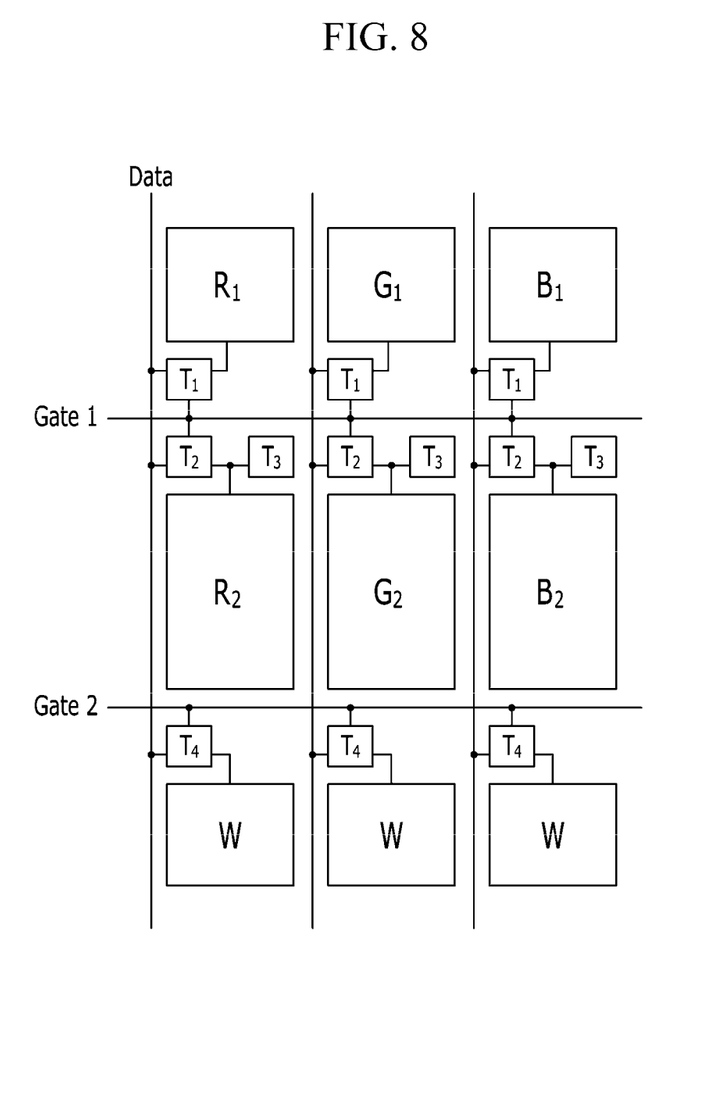
FIG. 8 is a layout view of a pixel of a liquid crystal display according to a further exemplary embodiment.
Figure 9:
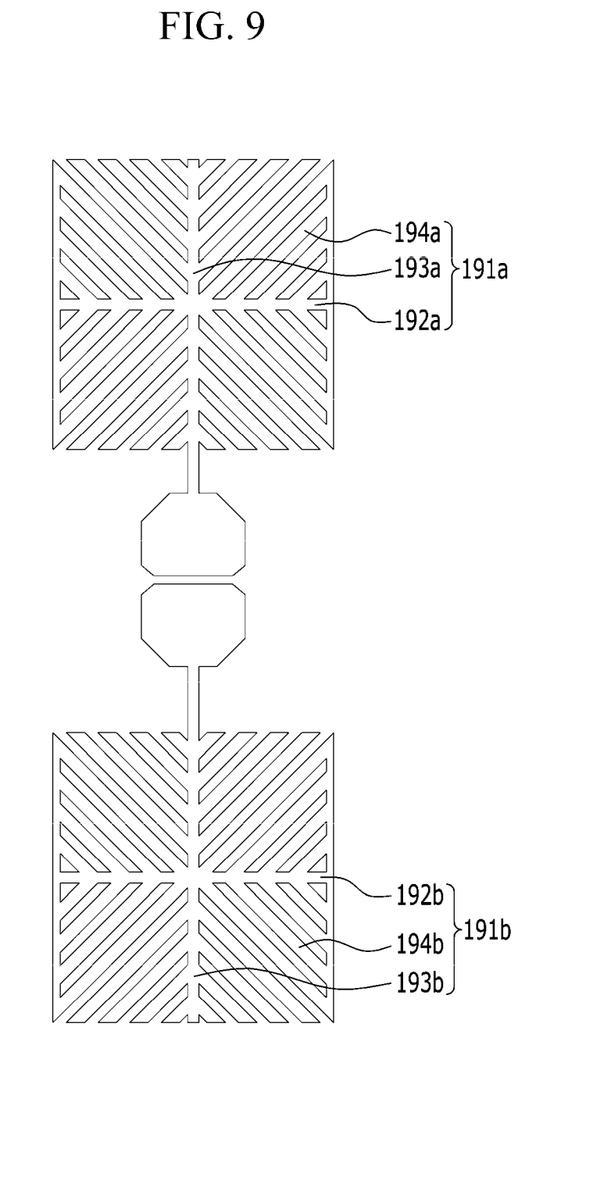
FIG. 9 is a layout view of a pixel electrode of a liquid crystal display according to an exemplary embodiment.

FIGS. 6, 7, and 8 are layout views of a pixel of a liquid crystal display according to different exemplary embodiments, and FIG. 9 is a layout view of a pixel electrode of a liquid crystal display according to an exemplary embodiment.

The layout of the red, green, and blue pixels is illustrated in FIG. 6. Specifically, first subpixel electrodes R1, G1, and B1, and second subpixel electrodes R2, G2, and B2, are respectively disposed at an upper side and a lower side of a gate line Gate. Three thin film transistors T1, T2, and T3 are disposed around the gate line Gate and configured to receive a gate control signal from the gate line Gate.

The layout of the white pixel is similar to the layout of the red, green, and blue pixels, in that a first subpixel electrode W1 and a second subpixel electrode W2 are respectively disposed at an upper side and a lower side of a gate line Gate. However, the layout of the white pixel differs from the layout of the red, green, and blue pixels as follows. Specifically, the white pixel further includes a thin film transistor T4, and each of the first subpixel electrode W1 and the second subpixel electrode W2 is connected to the same thin film transistor T4 and configured to receive the same voltage therefrom. Since the white pixel includes the thin film transistor T4, the aperture ratio can therefore be increased by increasing the size of the second subpixel electrode W2. The first subpixel electrode W1 and the second subpixel electrode W2 of the white pixel may be integrally formed.

The layout of the white pixel may be changed in various ways.

Referring to FIG. 7, the red, green, and blue pixels are disposed longitudinally in a direction of the data lines. Specifically, first subpixel electrodes R1, G1, and B1, and second subpixel electrodes R2, G2, and B2, are respectively disposed at an upper side and a lower side of a first gate line Gate 1, and three thin film transistors T1, T2, and T3 are disposed around the first gate line Gate 1 and configured to receive a gate control signal from the first gate line Gate 1.

A white pixel is disposed longitudinally below the red, green, and blue pixels in a horizontal direction. The white pixel includes a pixel electrode W and the thin film transistor T4. The input terminal and the control terminal of the thin film transistor T4 are respectively connected to a data line Data and a second gate line Gate 2. The pixel electrode W is connected to the output terminal of the thin film transistor T4.

As shown in FIG. 8, the white pixel may include three white pixels for the red pixel, the green pixel, and the blue pixel, respectively.

Data lines are formed corresponding to the red pixel, the green pixel, and the blue pixel, respectively. In addition, a second gate line Gate 2 is formed. Accordingly, a thin film transistor T4 and a pixel electrode W may be disposed in each of the white pixels, and each of the white pixels in FIG. 9 may be charged with different voltages.

The subpixel electrodes of the red, green, blue, and white pixels may have a slit structure as shown in FIG. 9.

Referring to FIG. 9, a first subpixel electrode 191a neighbors a second subpixel electrode 191b in a column direction. Each of the first subpixel electrode 191a and the second subpixel electrode 191b includes a cross-shaped branch unit having a quadrangular shape with horizontal stems 192a and 192b and vertical stems 193a and 193b crossing the horizontal stems 192a and 192b, respectively. Further, the first subpixel electrode 191a and the second subpixel electrode 191b are respectively divided into four subregions by the horizontal stems 192a and 192b and the vertical stems 193a and 193b, and each subregion includes a plurality of minute branches 194a and 194b.

One of the minute branches 194a and 194b disposed at the four subregions extends obliquely from the horizontal stems 192a and 192b or the vertical stems 193a and 193b in an upper left direction, and another of the minute branches extends obliquely from the horizontal stems 192a and 192b or the vertical stems 193a and 193b in an upper right direction. Further, another of the minute branches extends obliquely from the horizontal stems 192a and 192b or the vertical stems 193a and 193b in a lower left direction, and another of the minute branches extends obliquely from the horizontal stems 192a and 192b or the vertical stems 193a and 193b in a lower right direction.

Each of the minute branches 194a and 194b forms an angle of approximately 40° to 45° with the horizontal stems 192a and 192b or the vertical stems 193a and 193b. Further, the minute branches 194a and 194b of two adjacent subregions may be perpendicular to each other.

The above-described slit structure of the subpixel electrodes may also be used for the pixel electrode in the white pixel.

Embodiments of the inventive concept have been described using a liquid crystal display as an exemplary display device. However, it should be understood that the inventive concept may be applied to other types of display devices such as organic light emitting devices.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising:
    a red pixel, a blue pixel, a green pixel, and a white pixel;
    a plurality of gate lines and data lines; and
    a plurality of storage electrode lines,
    wherein each of the red pixel, the blue pixel, and the green pixel comprises two subpixel electrodes connected to a same gate line and a same data line, and the two subpixel electrodes are charged with different voltages, wherein every subpixel electrode included in the white pixel and connected to a same gate line and a same data line have a same voltage, and wherein the white pixel comprises two subpixels including a first subpixel electrode disposed at an upper side of a gate line, and a second subpixel electrode disposed at a lower side of the gate line, and the first subpixel electrode and the second subpixel electrode are disposed facing each other with the gate line therebetween.

2. The display device of claim 1, wherein each of the red pixel, the blue pixel, and the green pixel comprises:

a first thin film transistor and a second thin film transistor, wherein a control terminal and an input terminal of each of the first and second thin film transistors are respectively connected to the same gate line and the same data line;

a third thin film transistor, wherein a control terminal of the third thin film transistor is connected to the same gate line, an input terminal of the third thin film transistor is connected to an output terminal of the second thin film transistor, and an output terminal of the third thin film transistor is connected to one of the storage electrode lines;

a third subpixel electrode connected to an output terminal of the first thin film transistor; and a fourth subpixel electrode connected to the output terminal of the second thin film transistor.

3. The display device of claim 2, wherein the white pixel comprises:

a fourth thin film transistor, wherein a control terminal of the fourth thin film transistor is connected to the same gate line and an input terminal of the fourth thin film transistor is connected to the same data line, wherein the first subpixel electrode and the second subpixel electrodes are connected to an output terminal of the fourth thin film transistor.

4. The display device of claim 1, wherein a third subpixel electrode of each of the red pixel, the blue pixel, and the green pixel is disposed at an upper side of a gate line, and a fourth subpixel electrode of each of the red pixel, the blue pixel, and the green pixel is disposed at a lower side of the gate line.

5. The display device of claim 1, wherein the second subpixel electrode of the white pixel is bigger than the first subpixel electrode of the white pixel.

6. The display device of claim 1, wherein the first subpixel electrode and the second subpixel electrode of the white pixel are integrally formed.

7. The display device of claim 1, wherein the red pixel, the blue pixel, the green pixel, and the white pixel are arranged in a direction in which the plurality of gate lines extend.

* * * * *